(12) United States Patent
Elaoud et al.

(10) Patent No.: US 8,238,235 B2
(45) Date of Patent: Aug. 7, 2012

(54) ADMISSION CONTROL FOR CONTENTION-BASED ACCESS TO A WIRELESS COMMUNICATION MEDIUM

(75) Inventors: Moncef Elaoud, Lake Hopatcong, NJ (US); Bechir Hamdaoui, Madison, WI (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 453 days.

(21) Appl. No.: 11/308,138

(22) Filed: Mar. 8, 2006

(65) Prior Publication Data

US 2007/0070902 A1 Mar. 29, 2007

Related U.S. Application Data

(60) Provisional application No. 60/595,290, filed on Jun. 21, 2005.

(51) Int. Cl.
*G01R 31/08* (2006.01)
*H04W 4/00* (2009.01)
(52) U.S. Cl. .................. 370/230; 370/231; 370/338
(58) Field of Classification Search .................. 370/230, 370/231, 338
See application file for complete search history.

(56) References Cited

U.S. PATENT DOCUMENTS 7,389,356 B2 * 6/2008 Shao et al. .................. 709/235
2006/0215686 A1 * 9/2006 Takeuchi ..................... 370/445

OTHER PUBLICATIONS

Garraoppo, Lecture Notes in Computer Science,Feb. 2005.*
Choi et a. , IEEE 802.11e Contention based Access (EDCF) Performance Evaluation, Proc. IEEE ICCC,May 2003.*
H. Zhang, "Service Disciplines for Guaranteed Performance Service in Packet-Switching Networks", Proceedings of IEEE, vol. 83, No. 10, Oct. 1995 [2].
J.C.R. Bennett, H. Zhang, "Hierarchical Packet Fair Queueing Algorithms", IEEE/ACM Transactions on Networking, vol. 5, No. 5, Oct. 1997.
Liang Zhang Lee, T.T. Dept. of Inf. Eng., Chinese Univ. of Hong Kong, Shatin, China, "Performance Analysis of Wireless Fair Queuing Algorithms with Compensation Mechanism" Jul. 26, 2004.
P. Ansel, Q. Ni, T. Turletti, "An Efficient Scheduling Scheme for IEEE 802.11e".

* cited by examiner

*Primary Examiner* — George Eng
*Assistant Examiner* — Muthuswamy Manoharan
(74) *Attorney, Agent, or Firm* — Westerman, Hattori, Daniels & Adrian, LLP (57) ABSTRACT

An access point station responds to a request from a user station for contention-based access of a new traffic flow to a wireless transmission medium by applying a model of the wireless local area network to estimate delay that data packets will experience when delivered through the wireless network, in order to admit the new flow upon determining that admission will not violate quality of service requirements of neither the new flow nor of already admitted flows. For example, the access point station applies the model by determining an average packet inter-arrival rate, solving a system of nonlinear equations to determine probabilities of successful transmission, applying network stability conditions, computing an upper bound on queuing delay for the packets, computing a service delay budget for the packets, and computing an expected fraction of missed packets from the service delay budget.

22 Claims, 6 Drawing Sheets

ADMISSION CONTROL FOR CONTENTION-BASED ACCESS TO A WIRELESS COMMUNICATION MEDIUM

DESCRIPTION

The present application claims priority under 35 U.S.C. 119 to provisional application Ser. No. 60/595,290 filed on Jun. 21, 2005, entitled Admission Control for I.E.E.E. 802.11 E.D.C.A. Mode, the entire disclosure of which is incorporated herein by reference.

BACKGROUND

1. Field of the Invention

This application relates generally to wireless data networks, and specifically to an admission control for contention-based access to a wireless communication medium.

2. Background of the Invention

Wireless local area networks (WLAN) are being used for convenient interconnection of portable computers to office data processing networks and to the Internet. Presently there is a desire to increase WLAN data throughput and quality of service in order to support real-time multimedia applications such as voice over Internet Protocol (IP) telephony and video streaming. For example, the Institute of Electrical and Electronics Engineers (IEEE) of Washington, D.C., is promulgating a standard 802.11 n for WLAN to provide a data throughput of at least 100 Mbit/sec.

One way of increasing the WLAN data throughput and quality of service is to use the bandwidth of the wireless transmission medium more efficiently. Because user stations in the WLAN share access to the wireless transmission medium, a considerable amount of the existing bandwidth is unavailable for transmission of user data, and instead is consumed in a process of scheduling access of the traffic flows to the wireless transmission medium. In general, the nature of the wireless transmission medium precludes the user stations from being synchronized to the extent that interference between the user stations is unlikely. Therefore, collision avoidance techniques are used in the process of scheduling access of the traffic flows to the wireless transmission medium.

Efficient methods of scheduling access of the traffic flows to the wireless transmission medium in a WLAN are the subject of IEEE standard 802.11e. Traffic flows can be serviced using either of two medium access methods, depending on the flow's preference. The first access method, called Hybrid Controlled Channel Access (HCCA), is polling based. In this first method, a Hybrid Coordination Function (HCF) grants transmission opportunities (TXOP) to all participating flows based on a schedule. The second access method, called Enhanced Distributed Channel Access (EDCA), is contention-based, in which flows compete to access the channel. In this second method, flows transmit packets whenever they sense that the shared medium is idle for a sufficient period of time. The Hybrid Coordination Function determines when each HCCA flow gets a chance to transmit and when control is ceded to EDCA traffic.

The following references are related to scheduling access to the wireless communication medium of an IEEE 802.11 WLAN:

[1] IEEE 802.11 Standard. Wireless LAN medium access control (MAC) and physical (PHY) layer specifications, IEEE, Washington, D.C., 1999.

[2] Part 11. Wireless medium access control (MAC) and physical (PHY) layer specifications: Medium access control (MAC) quality of service (QoS) enhancements, January 2004.

[3] J. Hui and M. Devetsikiotis, "Desinging improved MAC packet schedulers for 802.11e WLAN," in Proceedings of IEEE GLOBECOM, 2003.

[4] D. Pong and T. Moors, "Call admission control for IEEE 802.11 contentionaccess mechanism," in Proceedings of IEEE GLOBECOM, 2003.

[5] G. Bianchi, "Performance analysis of the IEEE 802.11 distributed coordination function," IEEE Journal on Selected Areas in Comm., vol. 18, no. 3, pp. 535, 547 2000.

[6] O. Tickoo and B. Sikdar, "Queuing analysis and delay mitigation in IEEE 802.11 random access MAC based wireless networks," in Proceedings of IEEE INFOCOM, 2004.

[7] Leonard Kleinrock, Queuing Systems. Volume 1: Theory, John Wiley & Sons, New York, 1975.

[8] Leonard Kleinrock, Queuing Systems. Volume 2: Computer Applications, John Wiley & Sons, New York, 1976

[9] ITU-T Recommendations, 1996.

References [3] and [4] study and analyze features of IEEE 802.11e. In [3], the authors provide an improved version of the model in [5] to account for IEEE 802.11e's features, and use their improved model to estimate the saturated throughput. The work in [4] proposes an admission control algorithm for the IEEE 802.11e EDCA based on throughput estimation. The work in [6] presents an analytical model for evaluating the queuing delays at nodes in IEEE 802.11 WLANs. Although this work does consider unsaturated networks, it applies to IEEE 802.11 WLANs.

An IEEE 802.11e quality of service (QoS) facility provides medium access control (MAC) enhancements to support applications with QoS requirements. These QoS enhancements are made available to all QoS stations (QSTAs) associated with a QoS access point (QAP). The hybrid coordination function (HCF) is implemented by all QSTAs.

The IEEE 802.11e EDCA mechanism provides differentiated and distributed access to the wireless channel using eight different user priorities (UPs). To provide support for the delivery of traffic with UPs at the QSTAs, the EDCA mechanism defines four access categories (ACs). QSTAs in each AC use an enhanced DCF (EDCF) to contend for transmission opportunities (TXOPs) all using an identical set of EDCA parameters specified by the QAP.

The EDCA parameters specified by the QAP include an arbitration inter-frame space (AIFS) period, an initial contention window ($W_0$) and/or a maximum contention window ($Wm$), and a persistent factor f. Before proceeding with transmission, QSTAs with higher UPs are allowed to wait for an arbitration inter-frame space (AIFS) period shorter than those with lower UPs. QSTAs with higher UPs are allowed to have smaller sizes of their initial ($W_0$) and/or maximum ($W_m$) contention windows. In the following description, $W_m = f^m W_0$ where m, referred to as number of backoff stages, will be used to characterize $W_m$. QSTAs can further be differentiated among each other via using different values of the persistent factor f; i.e., higher priority ACs can use smaller values of f than those with lower priority.

Prior to transmitting a packet, a QSTA must first sense the medium to be idle for the AIFS period. Then, to reduce collision, the QSTA must wait for an additional random backoff period calculated as b×T, where b is a number, called backoff counter, selected from a uniform distribution in the interval [0, $W_0-1$], and T is the length of a time slot period.

$W_0$ is a fixed number. While waiting, the QSTA decrements its counter by 1 every idle time slot. Every time the medium becomes busy, the QSTA must freeze its backoff counter. Once the counter is frozen, the QSTA resumes decrementing the counter by 1 every idle time slot after sensing the medium again idle for a AIFS period. When the counter reaches 0, the QSTA proceeds with transmission. In case of unsuccessful transmission, the QSTA keeps retransmitting the packet until it either succeeds or reaches a threshold number of attempts. At the $i^{th}$ retransmission attempt, the contention window size W must equal $W_i=\max\{f^i \times W_0, W_m\}$. Upon a successful transmission, the contention window is reset to its initial size.

The IEEE 802.11e EDCA mechanism provides a general framework for admission control, but it does not specify precisely when to admit a new flow so as to preserve the QoS of existing flows. The work in [4] attempts to address this problem by estimating the throughput that flows would achieve if a new flow with certain parameters were admitted, by dealing with the EDCA parameters of minimum contention window size and transmission opportunity durations. The objective in [4] is to limit the total admitted traffic in the WLAN below the total achievable throughput, so that the current admitted traffic can be protected and channel utilization will not degrade significantly. A difficulty in implementing this approach in 802.11 lies in estimating the value of the achievable throughput in the WLAN.

The solution proposed in [4] is to estimate the throughput of the flows based on the monitored collision rate of each flow and parameters decided at run-time including the minimum collision window, the maximum collision window, the physical layer transmission rate, and the TXOP duration. From this information, the transmission probability for a flow i at saturation is calculated from the following formula:

$$P(tx \text{ in a slot} | \text{flow} = i) = \frac{2(1-2p_i)}{(1-2p_i)(W+1)+p_i W(1-(2p_i)^b)} \quad (1)$$

pi=long term collision probability of flow i
W=$CW_{min}$ size used for flow i
b=maximum backoff stage with $CW_{max}=(CW_{min}+1) \times 2^b - 1$ The achievable throughput for the flow is then calculated from the transmission probability for the flow using the following equation:

$$\text{Achievable throughput}[i] = \frac{P(\text{successful transmission} | \text{flow} = 1) \times \text{Data payload size}}{P(\text{collision}) \times Duration_{collision} + P(\text{slot is idle}) \times aSlotTime + P(\text{successful transmission}) \times Duration_{success}}$$

If admitting the new flow causes the achievable throughputs for the flows to be insufficient, then admission of the new flow is rejected. Otherwise, the admission controller searches for the best parameters for $CW_{min}$ and TXOP duration (if used), given the required bandwidth of the new flow.

SUMMARY OF THE INVENTION

The present invention recognizes that for real-time multimedia applications such as voice and video transmission, there are delay requirements that are not satisfied by guarantees of achievable throughput. For such real-time applications, data packets that are delayed beyond their maximum tolerance are rejected by the applications. Thus, the present invention is directed to modeling and analysis of the contention-based access mechanism from a delay point of view. As should be evident from the following detailed description, the problem of addressing delay requirements is mathematically difficult in comparison to addressing throughput requirements.

In accordance with one aspect, the invention provides a computer-implemented method used in a wireless local area network having an access point station and user stations sharing access to a wireless transmission medium. The access point station responds to a request from a user station for contention-based access of a new traffic flow of data packets from the user station to the wireless transmission medium when the wireless transmission medium is carrying a number of already admitted traffic flows of data packets. The already admitted traffic flows have quality of service requirements including maximum delay budgets and ratios of unsuccessfully delivered data packets tolerated by applications that receive the already admitted traffic flows. The method includes obtaining quality of service requirements for the new traffic flow, the quality of service requirements including a maximum delay budget and a ratio of unsuccessfully delivered data packets tolerated by an application to receive the new traffic flow. The method also includes applying a model of the wireless local area network to estimate delay that the data packets will experience when delivered through the wireless local area network, in order to determine whether or not admission of the new traffic flow will violate the quality of service requirements of the new traffic flow or the already admitted traffic flows. The method further includes admitting the new traffic flow upon determining that admission of the new traffic flow will not violate the quality of service requirements of neither the new traffic flow nor of the already admitted traffic flows.

In accordance with another aspect, the invention provides a computer-implemented method used in a wireless local area network having an access point station and user stations sharing access to a wireless transmission medium in accordance with IEEE standard 802.11e. The access point station responds to a request from a user station for access of a new traffic flow of data packets from the user station to the wireless transmission medium in accordance with Enhanced Distributed Channel Access (EDCA) when the wireless transmission medium is carrying a number of already admitted traffic flows of data packets. The new traffic flow and the already admitted traffic flows have quality of service requirements including maximum delay budgets and ratios of unsuccessfully delivered data packets tolerated by applications that receive the already admitted traffic flows. The method includes applying a model of the wireless local area network to estimate delay that the data packets will experience when delivered through the wireless local area network, in order to determine whether or not admission of the new traffic flow will violate the quality of service requirements of the new traffic flow or the already admitted traffic flows. The method further includes admitting the new traffic flow upon determining that admission of the new traffic flow will not violate the quality of service requirements of neither the new traffic flow nor of the already admitted traffic flows.

In accordance with yet another aspect, the invention provides an access point station for a wireless local area network having user stations sharing access to a wireless transmission medium in accordance with IEEE standard 802.11e. The access point station includes a network interface for linking the access point station to a wireline network, a wireless transceiver for wireless communication with the user stations; and at least one processor programmed for responding to a request from a user station for access of a new traffic flow of data packets from the user station to the wireless transmission medium in accordance with Enhanced Distributed Channel Access (EDCA) when the wireless transmission medium is carrying a number of already admitted traffic flows of data packets. The new traffic flow and the already admitted traffic flows have quality of service requirements including maximum delay budgets and ratios of unsuccessfully delivered data packets tolerated by applications that receive the already admitted traffic flows. The at least one processor is programmed for applying a model of the wireless local area network to estimate delay that the data packets will experience when delivered through the wireless local area network, in order to determine whether or not admission of the new traffic flow will violate the quality of service requirements of the new traffic flow or the already admitted traffic flows. The at least one processor is further programmed for admitting the new traffic flow upon determining that admission of the new traffic flow will not violate the quality of service requirements of neither the new traffic flow nor of the already admitted traffic flows.

BRIEF DESCRIPTION OF THE DRAWINGS

Additional features and advantages of the invention will be described below with reference to the drawings, in which.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENTS

Figure 1:
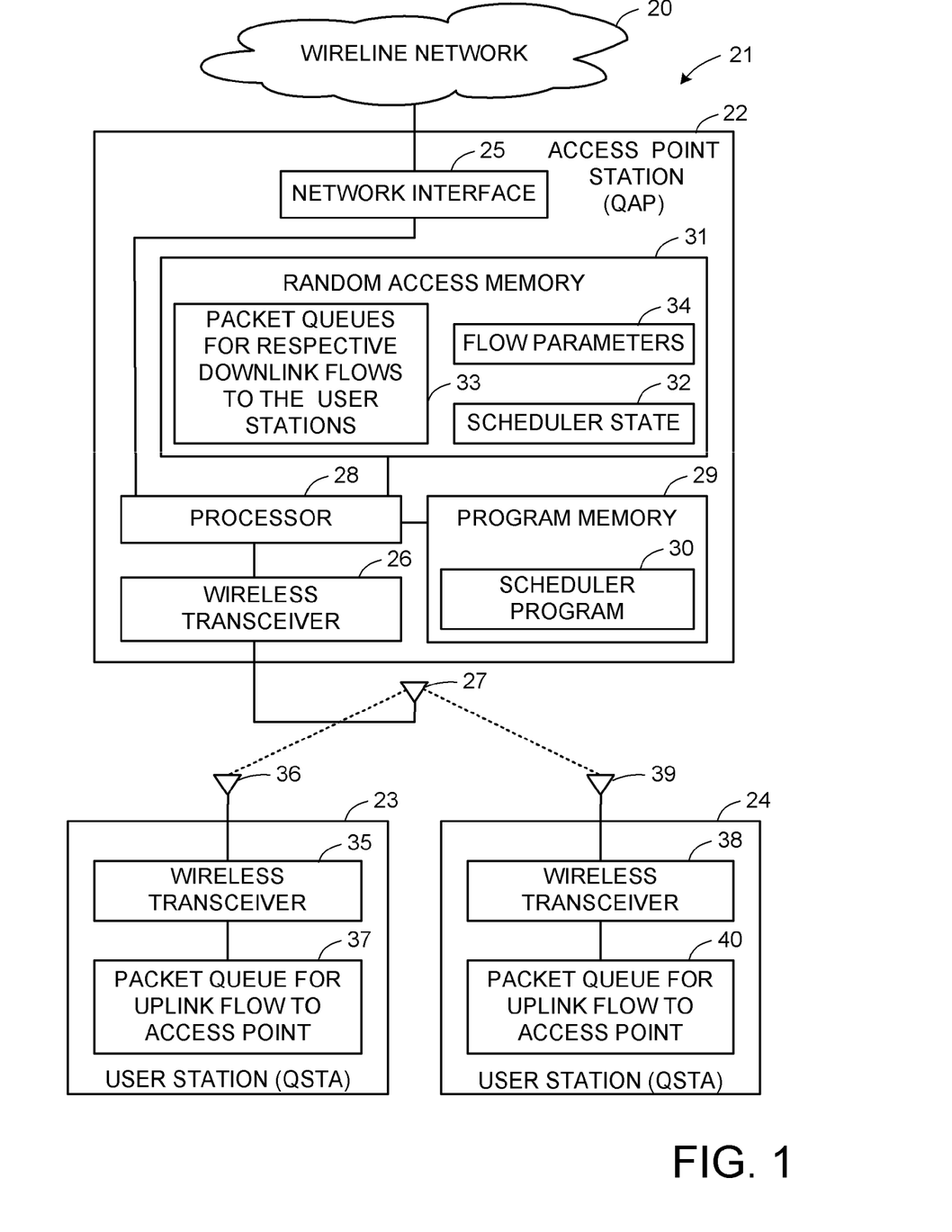
FIG. 1 is a block diagram of a WLAN using a scheduler program in accordance with the present invention.

With reference to FIG. 1, there is shown a wireline network 20 connected to a wireless local area network (WLAN) generally designated 21. The WLAN 21 includes an access point station (AP) 22, and a number of user stations 23, 24. For example, the wireline network 20 is the Internet or a corporate data processing network, the access point station 22 is a wireless router, and the user stations 23, 24 are portable computers or portable voice-over-IP telephones.

The access point station 22 has a network interface 25 linked to the wireline network 21, and a wireless transceiver in communication with the user stations 23, 24. For example, the wireless transceiver 26 has an antenna 27 for radio or microwave frequency communication with the user stations 23, 24. The access point station 22 also has a processor 28, a program memory 29 containing a scheduler program 30, and a random access memory 31. The random access memory 31 contains state information 31 of the scheduler program, packet queues 33 including a respective packet queue for a respective downlink flow to each user station, and flow parameters 34.

The user station 23 has a wireless transceiver 35 including an antenna 36 for communication with the access point station 22. The user station also includes a packet queue 37 for uplink flow to the access point station. In a similar fashion, the user station 24 has a wireless transceiver 38, an antenna 39, and a packet queue 40 for uplink flow to the access point station 22.

The present invention more particularly concerns the scheduler program 30. It is desired to provide a scheduler program for contention-based access of flows having delay requirements, such as flows for voice-over-IP telephony, video streaming, and other real-time applications. In order to meet the delay requirements, the flow parameters 34 are used to compute an approximation of the delay experienced by the packets when traveling through the WLAN. This approximated delay is used in an admission control for contention-based access of flows of the same access category (AC) to the wireless transmission medium.

In order to derive an analytical approximation for the packet delay, assume that a WLAN in accordance with IEEE 802.11e (see reference [2] above) consists of one access point station 22 that will be referred to as the QAP, and a number N of user stations 23, 24 referred to as QSTAs. Assume that each QSTA generates a flow destined to the QAP. Further assume that all the N flows are identical and contend with equal chances for accessing the wireless medium. Let A be a random variable representing the inter-arrival time between packets measured at their arrivals to QSTAs' queues, and a(t) be the corresponding distribution. Also, let q be the probability of finding a non-empty queue upon arrival of a packet to a QSTA's queue corresponding to the studied AC.

Given that the QAP has N downstream flows while each QSTA has only one upstream flow—all competing with each other, the QAP ought to be given a greater share of the medium than each QSTA. In the following WLAN model, the QAP is allowed to have an EDCA parameter set different from that of a QSTA. All QSTAs, however, have identical EDCA parameter sets since all of them are treated equally. In the remainder of this description, a subscript a associated with any parameter indicates that the parameter corresponds to the QAP. (In the following, derivations are provided for the case of QSTAs. Expressions corresponding to the QAP are inferred by analogy from those derived for QSTAs.) For example, while $W_0$ denotes the initial contention window size of a QSTA, $W_{0,a}$ denotes that of the QAP.

Figure 2:
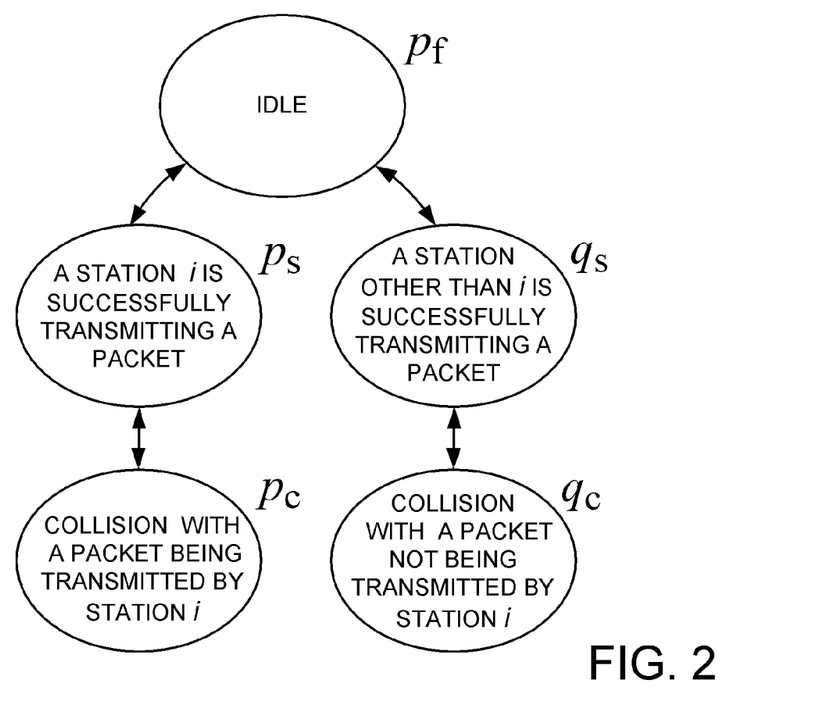
FIG. 2 is a diagram of states of packet transmission in the WLAN of FIG. 1 as sensed by a user station.

Let i be a given QSTA. As shown in FIG. 2, at any time, QSTA i may sense the wireless medium to be in one and only one of the following states: (1) With probability $p_f$, the medium is not being used for transmission by any QSTA, nor by the QAP; i.e., the medium is idle. (2) With probability $p_s$, QSTA i is successfully transmitting a packet via the medium. (3) With probability $q_s$, either any QSTA other than i or the QAP is successfully transmitting a packet via the medium. (4) With probability $p_c$, a collision is occurring due to a delivery of an i s packet. (5) With probability $q_c$, a collision is occurring not due to an i s packet transmission (i is not transmitting).

In a similar fashion, from the QAP's perspective, at any time, the wireless medium may be sensed to be in one and only one of the following states: (1) With probability $p_{f,a}$, the medium is not being used for transmission by any QSTA, nor by the QAP. (2) With probability $p_{s,a}$, QAP is successfully transmitting a packet via the medium. (3) With probability $q_{s,a}$, a QSTA (not the QAP) is successfully transmitting a packet via the medium. (4) With probability $p_{c,a}$, a collision is occurring due to a delivery of a QAP's packet. (5) With probability $q_{c,a}$, a collision is occurring involving none of the QAP's packets (QAP is not transmitting).

When sensing the medium, each one of these states may be thought of as a different time slot, each of which has different length. These slots will be called virtual time slots. Each virtual slot may occur with a different probability. We assume that the length of each virtual time slot falls into one of the following three lengths: $T_f$, $T_s$, and $T_c$. The virtual time slot corresponding to idle medium and occurring with probability $p_f$ or $p_{f,a}$ is of length $T_f$; those corresponding to successful transmissions and occurring with probability $p_s$, $q_s$, $p_{s,a}$, or $q_{s,a}$ are of length $T_s$; and those corresponding to collided transmissions and occurring with probability $p_c$, $q_c$, $p_{c,a}$, or $q_{c,a}$ are of length $T_c$. Note that $T_f$, $T_s$, and $T_c$ depend on parameters such as packet lengths and transmission rates.

In the following derivation, the lengths $T_f$, $T_s$, and $T_c$ are assumed to be constants. Also, the QSTAs and the QAP are considered to all belong to the same AC and hence are likely to generate similar traffic, so it is further assumed that $T_f$, $T_s$, and $T_c$ are the same for all stations including the QAP. For validation purposes, they are computed later in this disclosure based on a simulated traffic model. Letting $E[T_{slot}]$ signify the expected length of a virtual time slot, from a QSTA's standpoint, then $$E[T_{slot}] = p_f T_f + (p_s + q_s) T_s + (p_c + q_c) T_c \text{tm} \quad (1)$$

Since the quantities $(p_s + q_s)$ and $(p_{s,a} + q_{s,a})$ both represent the network's transmission success (the former from a QSTA's perspective and the latter from the QAP's perspective), these two quantities are then identical (this claim can easily be proven analytically). Similarly, since the quantities $(p_c + q_c)$ and $(p_{c,a} + q_{c,a})$ both represent the network's transmission failure, the two quantities are also equal. Finally, the probability of sensing the medium idle is also independent of who is sensing the medium ($p_f = p_{f,a}$). Hence $E[T_{slot}] = E[T_{slot,a}]$.

Figure 3:
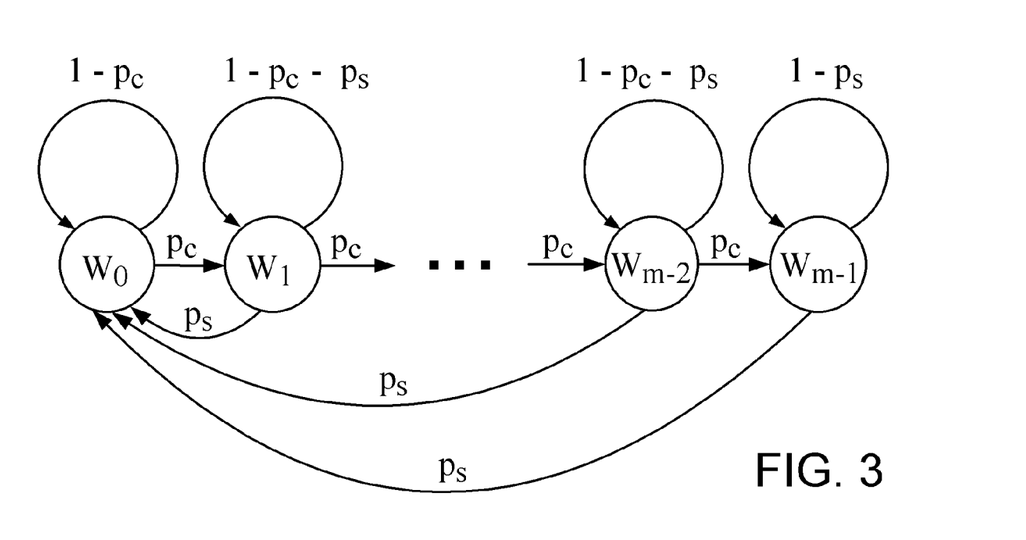
FIG. 3 is a diagram of a discrete-time Markovian chain of a contention window size for contention-based access of user stations to the transmission medium of the WLAN of FIG. 1.

Next is a derivation of the average of the window contention size $W$, $W_a$. Let i designate any QSTA. Initially, the size $W$ of the contention window of i is set to $W_0$. If the first transmission attempt fails, i keeps retransmitting the packet until it succeeds or reaches a threshold number of attempts. Thereafter, the threshold number of attempts is ignored and this number is assumed to be large enough not to be reached. Since a $k^{th}$ attempt takes place only when the $(k-1)^{th}$ attempt resulted in a collision involving i itself, the transition from $W_{k-1}$ to $W_k$ occurs with probability $p_c$ for all $k=\{1,\ldots,m-1\}$. When $W$ reaches $W_m$ and i is still retransmitting, any further attempt uses $W_m$ as the size of the window. Hence, $W$ stays at $W_m$ with probability $1-p_s$. Only when i succeeds (with probability $p_s$) the value of $W$ is reset to its initial size $W_0$. This is independent of the backoff stage at which i is attempting. While i is in backoff stage k with current window size $W_k$, $W$ stays equal to $W_k$ so long as i is not attempting (medium is busy or backoff counter is not zero yet). This happens with probability $1-p_c-p_s$ since an attempt—transmit and succeed or transmit and collide—occurs with probability $P_c+p_s$. Therefore, the window size $W$ of a given QSTA can be modeled as a discrete-time Markovian chain with m states, each of which corresponds to a backoff stage, as shown in FIG. 3. The stationary distribution $\pi_i$, $0 \le i \le m-1$, of the Markovian chain can be expressed as $$\begin{cases} \pi_i = p(1-p)^i, & 0 \le i \le m-2 \\ \pi_{m-1} = (1-p)^{m-1} \end{cases}$$

Where $p = p_s/(p_s+p_c)$. Therefore, the average of the window size $W$ of any QSTA can be written as $$\overline{W} = \frac{p - (f-1)f^{m-1}(1-p)^m}{1 - f(1-p)} W_0 \quad (2)$$

One can analogously derive the average of the size $W_a$ of the QAP as $$\overline{W_a} = \frac{p_a - (f_a-1)f_a^{m_a-1}(1-p_a)^{m_a}}{1 - f_a(1-p_a)} W_{0,a} \quad (3)$$

where $p_a = p_{s,a}/(p_{s,a}+p_{c,a})$. Note that the new introduced system parameters, $p$ and $p_a$, represent the fraction of the successful attempts to that of all tried ones respectively of a QSTA and the QAP.

Next is a derivation of expressions for the probabilities of occurrence of all the medium states that i may sense. Let i be any QSTA and v be any given virtual time slot. The probability $p_f$ is defined to be the probability of finding the medium idle at V. It can be expressed as $$p_f = \left(1 - \frac{q_a}{W_a}\right)\left(1 - \frac{q}{W}\right)^N$$

The probability $p_s$ of being successfully transmitting via the medium at v can similarly be computed as $$p_s = \frac{q}{W}\left(1 - \frac{q_a}{W_a}\right)\left(1 - \frac{q}{W}\right)^{N-1} \quad (4)$$

The probability $q_s$, of either a QSTA other than i or the QAP being successfully transmitting via the medium at v can similarly be computed as $$q_s = (N-1)\frac{q}{W}\left(1 - \frac{q_a}{W_a}\right)\left(1 - \frac{q}{W}\right)^{N-1} + \frac{q_a}{W_a}\left(1 - \frac{q}{W}\right)^N$$

The probability $p_c$ that a collision in the medium is occurring at v due to i s packet transmission can similarly be computed as $$p_c = \frac{q}{W}\left(1 - \left(1 - \frac{q_a}{W_a}\right)\left(1 - \frac{q}{W}\right)^{N-1}\right)$$

The probability $q_c$ that a collision in the medium is occurring at v provided that i is not transmitting can similarly be computed as $$q_c = 1 - \frac{q}{W} - (N-1)\frac{q}{W}\left(1 - \frac{q_a}{W_a}\right)\left(1 - \frac{q}{W}\right)^{N-1} - \left(1 - \frac{q}{W}\right)^N$$

It is worth noting that all these probabilities depend on q, $q_a$, p and $p_a$ only. Using the fact that $p=p_s/(p_s+p_c)$ results in following equation (called the QSTA Fractional Success Equation).

$$p = \left(1 - \frac{q_a}{W_a}\right)\left(1 - \frac{q}{W}\right)^{N-1} \tag{5}$$

Similarly, one can now derive expressions for the probabilities ($p_{f,a}$, $p_{s,a}$, $q_{s,a}$, $p_{c,a}$, and $q_{c,a}$) of occurrence of all the medium states that the QAP may sense. For example, the probability $p_{s,a}$ of the QAP being successfully transmitting via the medium at a given virtual time slot can be written as $$p_{s,a} = \frac{q_a}{W_a}\left(1 - \frac{q}{W}\right)^N \tag{6}$$

Now using the fact that $p_a=p_{s,a}/(p_{s,a}+p_{c,a})$ results in a second equation (called the QAP Fractional Success Equation)

$$p_a = \left(1 - \frac{q}{W}\right)^N \tag{7}$$

of only that p, $p_a$, and q as unknowns.

One point that requires attention is that both the QSTA Fractional Success Equation and the QAP Fractional Success Equation contain only the unknowns p, $p_a$, q, $q_a$. Hence two equations have been derived with four unknowns all of which (and only them) are needed to compute all the probabilities. It will become clear later that these probabilities are computed in order to approximate the delay experienced by packets. Hence two more equations are needed to solve for the unknowns p, $p_a$, q, $q_a$.

Next is a derivation of service time. The delay that packets experience when delivered through a WLAN has two components: queuing delay, and service delay (hereafter, the service delay will be referred to as service time). The queuing delay is the amount of time that packets spend on the queue; i.e., the time between the moment packets arrive at the queue and the moment packets arrive at the head of the queue. The service time is the amount of time counted from the moment packets reach the head of queue until they arrive successfully at their destinations.

Let S be a random variable representing the service time at a QSTA in terms of the number of virtual time slots. Similarly, $S_a$ will denote that of the QAP. Let i be a given QSTA. Provided that at this instant a packet just reached the head of the queue of i, S for this packet is then the number of virtual time slots needed for i to successfully deliver the packet via the wireless medium.

The probability mass function (pmf) of S and $S_a$ can be written as $P[S=k]=p_s(1-p_s)^{k-1}$ and $P[S_a=k]=p_{s,a}(1-p_{s,a})^{k-1}$ for k=1, 2, ... where $p_s$ and $p_{s,a}$ are given respectively in Eqs. (4) and (6). One can approximate the probability that the service time S(resp. $S_a$) of a packet delivered by a QSTA (resp. the QAP) equals T seconds as $p_s(1-p_s)^{k-1}$(resp. $p_{s,a}(1-p_{s,a})^{k-1}$) where $$k = \left\lfloor \frac{T}{E[T_{slot}]} \right\rfloor$$

Note that the service time is computable only if the probabilities $p_s$ and $p_{s,a}$ are known, and $p_s$ and $p_{s,a}$ also depend only on the four unknowns p, $p_a$, q, $q_a$. To solve for these unknowns, two more equations are needed.

Next Lindley's Equations are applied (from reference [7] cited above). The service times S and $S_a$ derived above are both Geometric with parameters $p_s$, and $p_{s,a}$, expected values $1/p_s$ and $1/p_{s,a}$, and cumulative mass functions (cmf) $P[S \leq k] = 1-(1-p_s)^k$ and $P[Sa \leq k]=1-(1-p_{s,a})^k$ for k=1, 2, ..., respectively. The discrete geometric random variables S and $S_a$ are approximated by the exponential random variables whose parameters are $p_s$ and $p_{s,a}$. Now by assuming an independence between A and S, from a QSTA's standpoint, the network can be thought of as a G/M/1 system with an average inter-arrival rate, λ, and an average service rate, $p_s$. Using the G/M/1 based Lindley's Equation, we obtain the following two equations $$q=A^*(p_s-p_sq) \tag{8}$$

and $$q_a=A^*_a(p_{s,a}-p_{s,a}q_a) \tag{9}$$

where $A^*$ and $A^*_a$ are the Laplace Transforms of the inter-arrival distributions of packets respectively at a QSTA (a(t)) and the QAP ($a_a(t)$).

The aim again is to develop an admission control procedure to regulate the admissibility of application with QoS requirements, such as real-time multimedia applications. Therefore, the periodic traffic model will now be considered since it captures most of the traffic generated by multimedia applications. In the following derivation, it is assumed that both the upstream and the downstream traffic traveling through the WLAN is periodic with an inter-arrival rate λ. The average inter-arrival rate at the QAP is considered to be $\lambda_a=N\times\lambda$. Therefore, Eqs. (8) and (9) can be written as $$\frac{1-q}{\log_e(q)}\frac{q}{W}\left(1 - \frac{q_a}{W_a}\right)\left(1 - \frac{q}{W}\right)^{N-1} = -\lambda \tag{10}$$

and $$\frac{1-q}{\log_e(q_a)}\frac{q_a}{W_a}\left(1 - \frac{q}{W}\right)^N = -\lambda N \tag{11}$$

There now have been derived four nonlinear equations (Eqs. (5), (7), (10), and (11)) with four unknowns (p, $p_a$, q, $q_a$). One can use traditional numerical methods to solve this system of equations. For the following analysis, MATLAB was used to do so. Once the system of equations is solved, the solution can be used to determine the probabilities $p_s$ and $p_{s,a}$, which are used to determine the service times. However, a solution obtained by solving the system of non-linear equations cannot be meaningful unless the network is stable.

Next is a derivation of network stability conditions. As for all G/M/1 queuing systems, in order for the network to be stable, the average inter-arrival rates of packets at a QSTA and at the QAP must be smaller than their corresponding average service rates. That is, $\lambda \leq p_s$, and $\lambda \leq p_{s,a}/N$. Hence, the following two equations (called Network Stability Equations)

$$\frac{q}{W}\left(1 - \frac{q_a}{W_a}\right)\left(1 - \frac{q}{W}\right)^{N-1} \geq \lambda \qquad (12)$$

and $$\frac{q_a}{W_a}\left(1 - \frac{q}{W}\right)^N \geq \lambda N \qquad (13)$$

must be satisfied—when solving the system of nonlinear equations, the solution must then satisfy Eqs. (12) and (13).

Next is a derivation of a model for the queuing delay, which is the second component of packet delay. The first component of packet delay, service time, has been modeled above. For a G/G/1 system, the average queuing delay (AQD) is shown in reference [8] to satisfy $$AQD \leq \frac{\sigma_a^2 + \sigma_s^2}{2\left(\frac{1}{\lambda} - \frac{1}{\mu}\right)} \qquad (14)$$

where $\lambda$ (resp. $\sigma_a^2$) and $^1$ $\mu$ (resp. $\sigma_s^2$) are the averages (resp. variances) of respectively the inter-arrival rates and service rates of the G/G/1 system. Note that the above upper-bound holds provided that the network is stable—i.e., the solution to the nonlinear system satisfies Eqs. (12) and (13).

Next is a description of an admission control for use by the scheduler program for admitting and/or rejecting flows with QoS requirements in IEEE 802.11e WLANs. It is assumed that packets of multimedia applications are considered successful and hence of useful and acceptable QoS if delivered within a total budget delay $\delta_{total}$. This budget is a parameter that is typically specified by the applications. It is also assumed that multimedia applications can tolerate a certain ratio of unsuccessfully delivered packets while the quality of application is still considered acceptable. Let $\zeta$ denote such ratio.

Figure 4:
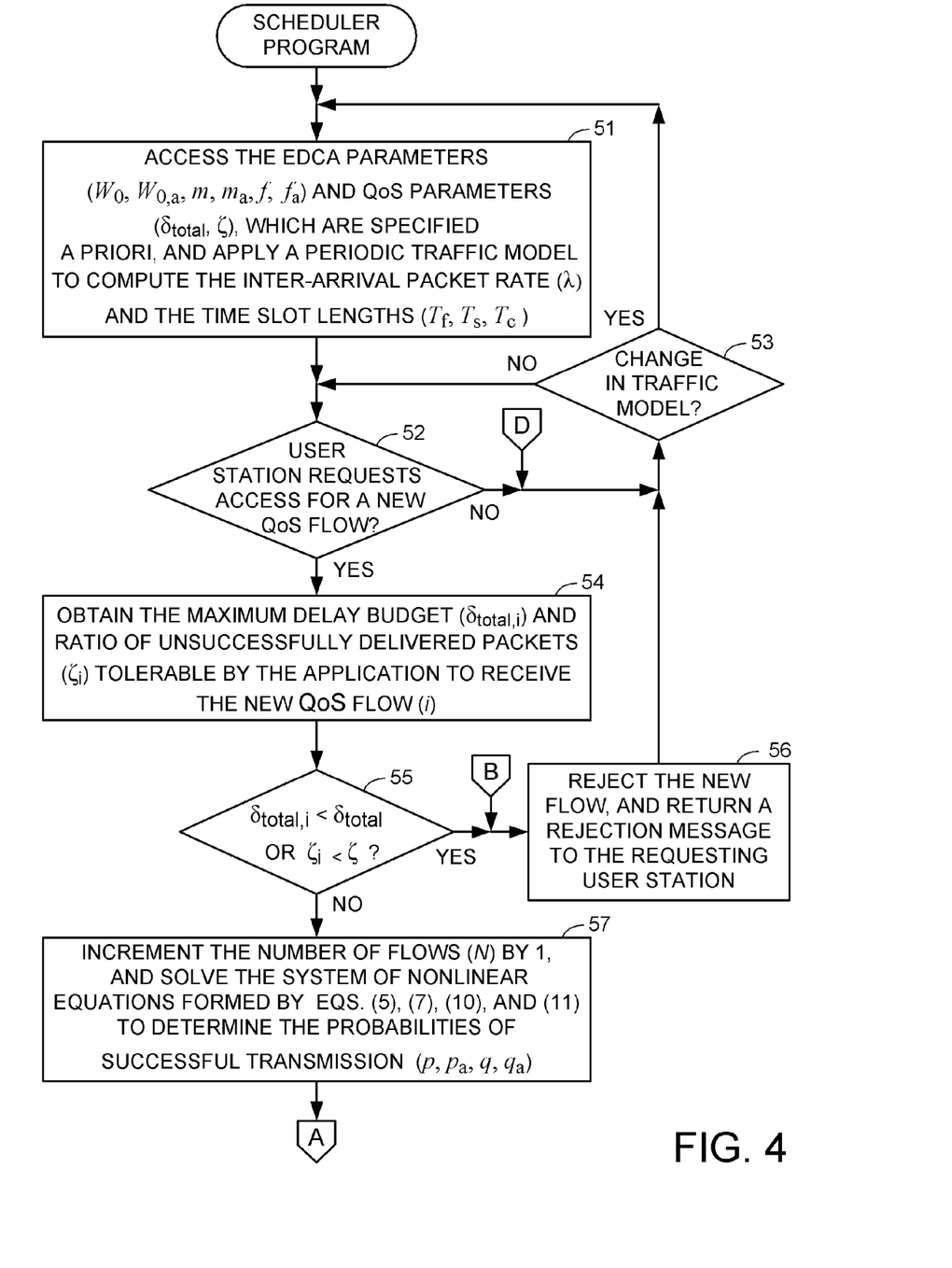
FIGS. 4 to 6 comprise a flowchart of the scheduler program introduced in FIG. 1.
Figure 5:
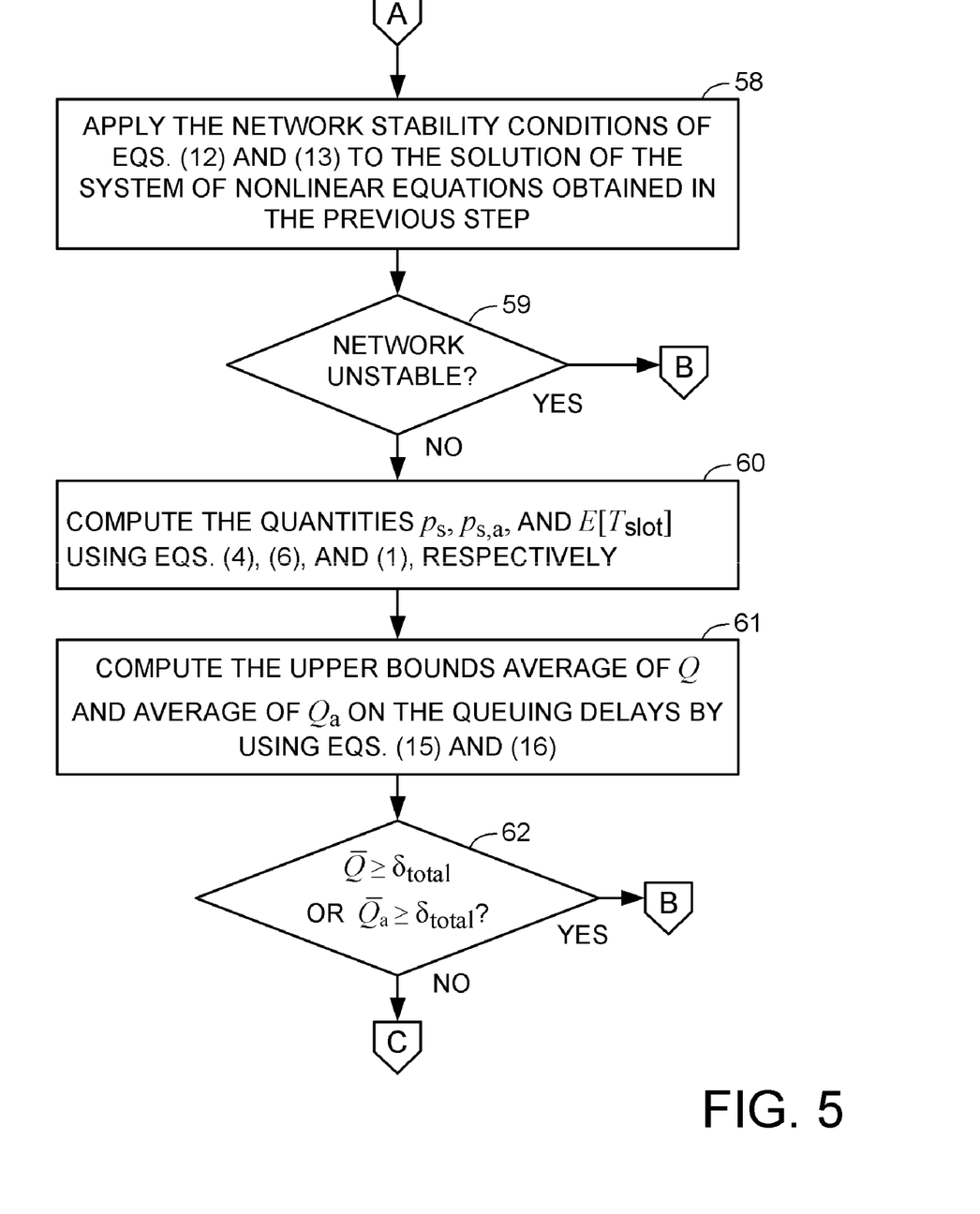
Figure 6:
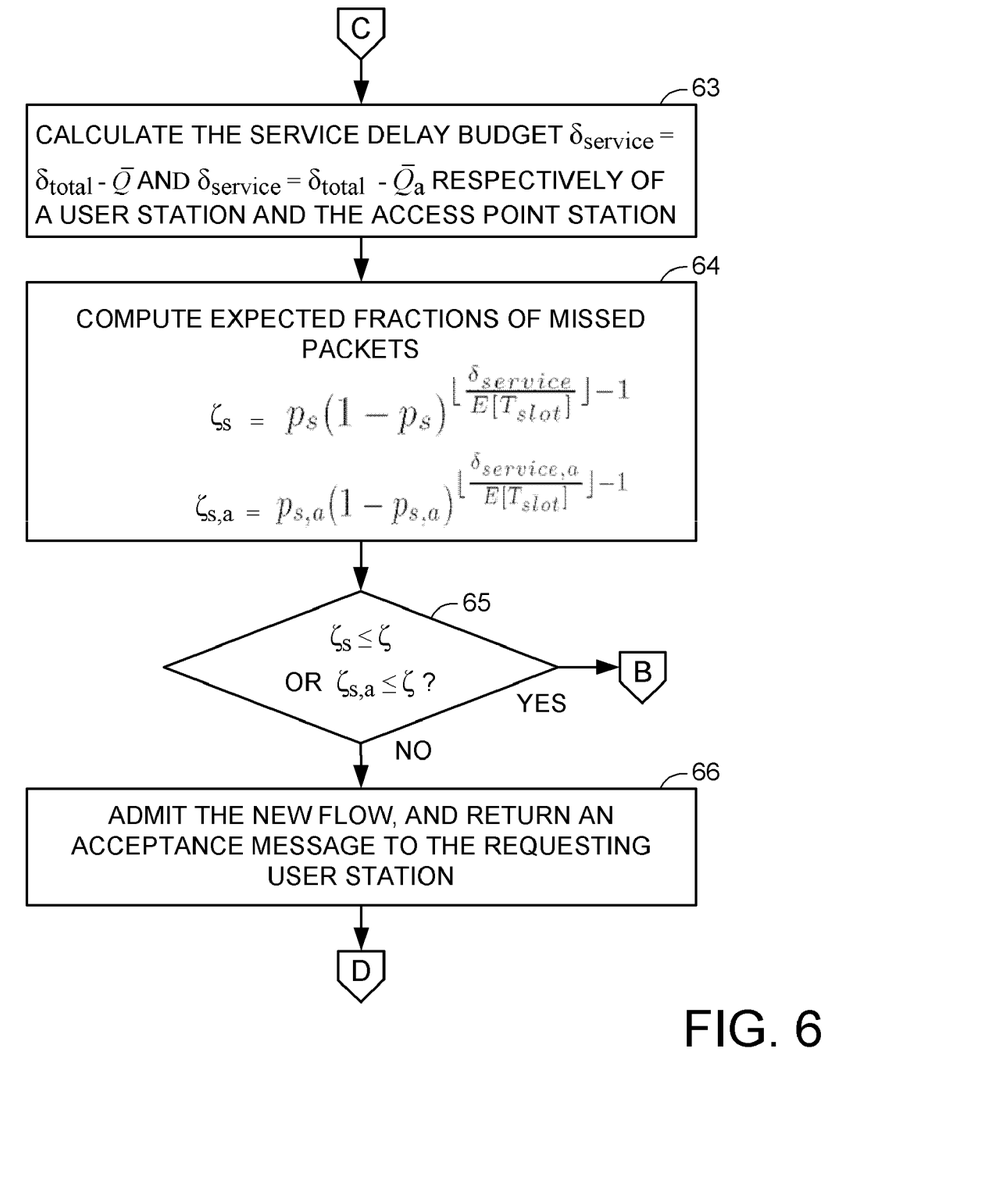

FIGS. 4 to 6 show a flowchart of the admission control of the scheduler program 30 for the WLAN of FIG. 1. For a given AC, the EDCA Parameters $W_0$, $W_{0,a}$, m, $m_a$, f, $f_a$ and the two QoS parameters $\delta_{total}$ and $\zeta$ are specified a priori. Therefore, in a first step 51, the processor (28 in FIG. 1) of the QAP (22 in FIG. 1) recalls the specified EDCA Parameters $W_0$, $W_{0,a}$, m, $m_a$, f, $f_a$ and QoS parameters $\delta_{total}$ and $\zeta$ from memory. Given the periodic traffic model, as described above, the QAP derives the inter-arrival packet rate $\lambda$, and the time slot lengths $T_f$, $T_s$, and $T_c$.

In step 52, the QAP is currently serving N user stations. In step 52, the QAP looks for a request from another QSTA seeking to establish a connection to the QAP for a new QoS flow, and in step 53, the QAP looks for any change in the traffic model that would warrant an update to the inter-arrival packet rate X, and the time slot lengths $T_f$, $T_f$, and $T_c$. If there is a change in the traffic model, then execution loops back from step 53 to step 51 to re-compute the inter-arrival packet rate $\lambda$, and the time slot lengths $T_f$, $T_f$, and $T_c$. When a new QSTA i desires to establish a connection with the QAP for a new QoS flow, execution continues from step 52 to step 54.

In step 54, the QAP obtains the maximum delay budget ($\delta_{total,i}$) and the maximum ratio of unsuccessfully delivered packets ($\zeta_i$) that is tolerable by the application that will be receiving the new flow. For example, these QoS parameters are included in the connection request from the QSTA i to the QAP. In general, the QAP will admit the requesting station i if doing so does not violate the QoS requirements of neither an already admitted station, nor the requesting station. Therefore, the QAP performs a series of tests to determine if admission will violate the QoS requirements.

In step 55, if the maximum delay budget ($\delta_{total,i}$) for the new QoS flow is less than the delay budget ($\delta_{total}$) that can be provided by the WLAN, then execution branches from step 55 to step 56. Execution also branches from 55 to step 56 if the ratio of unsuccessfully delivered packets ($\zeta_i$) that is tolerable by the application that will be receiving the new flow is less than the ratio of unsuccessfully delivered packets ($\zeta$) that can be achieved by the WLAN. In step 56, the new flow is rejected, and the QAP returns a rejection message to the requesting QSTA i. If neither $\delta_{total,i} < \delta_{total}$ nor $\zeta_i < \zeta$, then execution continues from step 55 to step 57.

In step 57, the QAP increments N by one and solves the system of nonlinear equations formed by Eqs. (5), (7), (10), and (11) to determine the probabilities of successful transmission (p, $p_a$, q, $q_a$). Execution continues from step 57 to step 58 in FIG. 5. In step 58 the QAP applies the Network Stability Conditions given by Eqs. (12) and (13) to the solution of the system of nonlinear equations obtained in the previous step 57. If any of these two conditions are not satisfied, as tested in step 59, then the network is unstable, so execution branches from step 59 back to step 56 of FIG. 4 to reject the new flow. In step 59, if the network is stable, then execution continues to step 60 of FIG. 5. In step 60, the QAP computes the quantities $p_s$, $p_{s,a}$, and $E[T_{slot}]$ using Eqs. (4), (6), and (1), respectively. Then in step 61, the QAP computes the upper bounds average of Q and average of $Q_a$ on the queuing delays by using Eqs. (15) and (16). Then in step 62, if the average of $Q \geq \delta_{total}$ or the average of $Q_a \geq \delta_{total}$, then execution branches back to step 56 of FIG. 4 to reject the new flow. Otherwise, if neither the average of $Q \geq \delta_{total}$ nor the average of $Q_a \geq \delta_{total}$, execution continues from step 62 to step 63 of FIG. 6.

In step 63 of FIG. 6, the QAP calculates the service delay budget $\delta_{service} = \delta_{total}$ – the average of Q and $\delta_{service,a} = \delta_{total}$ – the average of $Q_a$ respectively of a QSTA and the QAP. If any of the two inequalities, $$p_s(1-p_s)^{\left\lfloor \frac{\delta_{service}}{E[T_{slot}]} \right\rfloor - 1} \leq \zeta$$

and $$p_{s,a}(1-p_{s,a})^{\left\lfloor \frac{\delta_{service,a}}{E[T_{slot}]} \right\rfloor - 1} \leq \zeta.$$

are not satisfied, then the request is rejected. Therefore, in step 64, the QAP computes these expected fractions of missed packets, and in step 65 compares them to the QoS paramenter $\zeta$. If these expected fractions of missed packets cannot be achieved by the WLAN, then execution branches from step 65 back to step 56 of FIG. 4 in order to reject the new flow. Otherwise, execution continues from step 65 to step 66. In step 66, the QAP admits the new flow and sends an acceptance message to the new requesting station QSTA i.

To validate the admission control as described above, an IEEE 802.11e EDCA WLAN was simulated. The simulated IEEE 802.11e EDCA WLAN consisted of one QAP and multiple QSTAs, and was an extension of IEEE 802.11b DCF WLAN with QoS enhancements. Packet parameters used in this simulation were taken from the IEEE 802.11 b standard [1] and are summarized in the Table I below.

TABLE I

Packet Parameters

| | PHY | MAC | RAT/UDP | LOAD | SIFS | ACK | AIFS |
|---|---|---|---|---|---|---|---|
| Size (Bytes) | 24 | 28 | 40 | L | — | 14 | — |
| Rate (Mpbs) | 1 | 11 | 11 | 11 | — | 1 or 2 | — |
| Time ($^1$s) | 192 | 20.36 | 29.09 | (L × 8)/11 | 10 | 192 + 56 | 10 + 20n |

The AIFS parameter was set to 10+20n µs where n is an integer. Simulated voice traffic was generated in accordance with the ITU-T G711 codec which samples voice at 64 kilo bits per second. Sampled bits were then grouped into packets. This grouping process is called packetization.

ITU-T G711 supports three types of packetization (10-millisecond, 20-millisecond, and 30-millisecond) each of which corresponds to a different voice packet payload L. In this simulation study, the 10-millisecond packetization scheme was considered using L=80 bytes. Using Table I, $T_f$, $T_s$, and $T_c$ can be computed respectively as 20, (509.5+20n+L×8/11),=and (529.5+20n+L×8/11) all in µs. Unidirectional streaming was considered where each QSTA either sends or receives a flow from the QAP. To calculate the time budget for each packet, it was assumed that, during their trip from the sender to the receiver, voice packets travel through a single WLAN. In such an environment, voice packets experience three types of delays before reaching the wireless station: $\delta_p$, packetization delay; $\delta_c$, coding/decoding delay; $\delta_{LAN}$ time to traverse a local area network. In the simulations, $\delta_c$=5 ms, and $\delta_{LAN}$=0 (negligible). Packets were considered to be received within an acceptable quality of service if they arrive at the receiving station no later than the average of D=200 ms [9]. This gives a total budget delay of $\delta_{total}$=average of D−$\delta_p$−$2\delta_c$−$\delta_{LAN}$=180 ms. It was also assumed that $\zeta$=2%.

Figure 7:
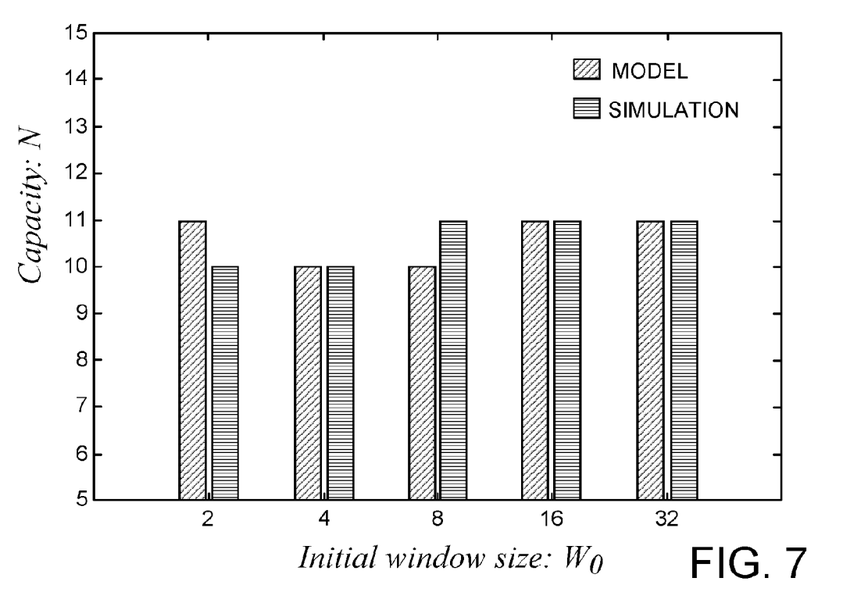
FIG. 7 is a graph of the capacity of the WLAN of FIG. 1 as a function of initial contention window size as computed from a model of the WLAN used by the scheduler program and as determined by simulation.
Figure 8:
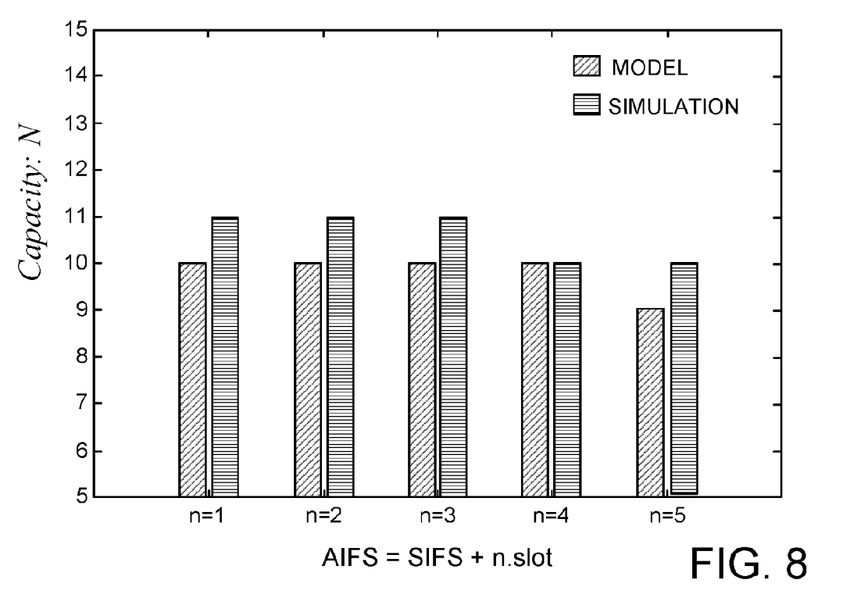
FIG. 8 is a graph of the capacity of the WLAN of FIG. 1 as a function of arbitrated interframe space (AIFS) as computed from a model of the WLAN used by the scheduler program and as determined by simulation.

During the simulations, the number of QSTAs in the WLAN was gradually increased until at least one of existing QSTAs did not meet its required packet success ratio. The network capacity is defined as the largest number of users that can be supported while satisfying all of their QoS requirements. The simulations were run for several initial contention windows and AIFSs. Results are shown in FIGS. 7 and 8.

To validate the model, we used the admission control program as described above to estimate the maximum number of users that can be successfully admitted into the network. Results are also shown in FIGS. 7 and 8. These figures show that the model used by the admission control program accurately estimates the maximum number of users that can be admitted into the network. These figures also show that in nine out of the ten simulated scenarios, the admission control program of FIGS. 4 to 6 either accurately calculates the capacity or underestimates it by a single user. Overestimating the capacity is generally more detrimental to the network operation. Hence the model and admission control heuristic performs well under a variety of simulation scenarios.

In view of the above, there has been described an admission control program for IEEE 802.11e EDCA WLANs. This admission control program is based on an analytical approximation of delays experienced by packets when delivered via the WLAN. The admission control program is validated through simulations of voice traffic.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. In a wireless local area network having an access point station and user stations sharing access to a wireless transmission medium, a computer-implemented method of the access point station responding to a request from a user station for contention-based access of a new traffic flow of data packets from the user station to the wireless transmission medium when the wireless transmission medium is carrying a number of already admitted traffic flows of data packets, the already admitted traffic flows having quality of service requirements including maximum delay budgets and ratios of unsuccessfully delivered data packets tolerated by applications that receive the already admitted traffic flows, the method comprising the steps of:
    (a) obtaining quality of service requirements for the new traffic flow, the quality of service requirements including a maximum delay budget and a ratio of unsuccessfully delivered data packets tolerated by an application to receive the new traffic flow;

(b) applying a periodic traffic model of the wireless local area network to estimate delay that the data packets will experience when delivered through the wireless local area network, including solving a system of nonlinear equations, derived from expressions of probability of occurrences of medium states that stations may sense, to determine probabilities of successful transmission, in order to determine whether or not admission of the new traffic flow will violate the quality of service requirements of the new traffic flow or the already admitted traffic flows; and (c) admitting the new traffic flow upon determining that admission of the new traffic flow will violate the quality of service requirements of neither the new traffic flow nor of the already admitted traffic flows; and wherein the estimate of delay is used in admission control for contention-based access of flows of the same access category (AC) to the wireless transmission medium, wherein said admission control includes:

accessing Enhanced Distributed Channel Access (EDCA) and Quality of Service (QoS) parameters pertaining to total budget delay and ratio of unsuccessful packets tolerated specified a priori;

based on the periodic traffic model deriving inter-arrival packet rate and virtual time slot lengths;

receiving a request from a new user station seeking a connection; and determining the probabilities of successful transmission based on said solving of said system of nonlinear equations.

2. The method as claimed in claim 1, wherein the step (b) of applying the model of the wireless local area network includes determining an average data packet inter-arrival rate.

3. The method as claimed in claim 1, which further includes applying network stability conditions to the solution of the system of nonlinear equations to determine that the network will be stable upon admitting the new traffic flow.

4. The method as claimed in claim 1, which includes computing an upper bound on queuing delay, that packets spend on a queue between arrival at the queue and arrival at a head of the queue, for data packets of the traffic flows, and comparing the upper bound on the queuing delay for the data packets of the traffic flows to a delay parameter for the quality of service for the network to determine that the upper bound on the queuing delay for the data packets of the traffic flows can be met by the wireless local area network.

5. The method as claimed in claim 1, which includes computing an upper bound on user station queuing delay, that packets spend on a queue between arrival at the queue and arrival at a head of the queue, for data packets of user station traffic flows, and comparing the upper bound on the user station queuing delay for the data packets of the user station traffic flows to a delay parameter for the quality of service for the network to determine that the upper bound on the user station queuing delay for data packets of the user station traffic flows can be met by the wireless local area network, and which includes computing an upper bound on access point station queuing delay for data packets of access point station traffic flows, and comparing the upper bound on the access point station queuing delay for the data packets of the access point station traffic flows to the delay parameter for the quality of service for the network to determine that the upper bound on the access point station queuing delay for data packets of the access point station traffic flows can be met by the wireless local area network.

6. The method as claimed in claim 1, which includes computing a service delay, that packets spend between arrival at a head of a queue and arrival at their destination, budget for data packets of the traffic flows, computing an expected fraction of missed data packets from the service delay budget, and comparing the expected fraction of missed data packets to a quality of service fraction of missed data packets for the wireless local area network to determine that the expected fraction of missed data packets can be met by the wireless local area network.

7. The method as claimed in claim 1, which includes computing a user station service delay budget, and computing a user station expected fraction of missed data packets from the user station service delay budget, and comparing the user station expected fraction of missed data packets to a quality of service fraction of missed data packets for the wireless local area network to determine that the user station expected fraction of missed data packets can be met by the wireless local area network, and which includes computing an access point station service delay budget, and computing an access point station expected fraction of missed data packets from the service delay budget for the access point station, and comparing the access point station expected fraction of missed data packets to the quality of service fraction of missed data packets for the wireless local area network to determine that the access point station expected fraction of missed data packets can be met by the wireless local area network.

8. The method as claimed in claim 1, wherein the estimate of delay is used in admission control for contention-based access of flows of the same access category (AC) to the wireless transmission medium, wherein said admission control includes:

a) specifying EDCA parameters and QoS parameters pertaining to total budget delay and ratio of unsuccessful packets tolerated a priori;

b) based on the periodic traffic model deriving inter-arrival packet rate and virtual time slot lengths;

c) receiving a request from a new user station seeking a connection;

d) based on the request in c) re-computing inter-arrival packet rate and virtual time slot lengths;

e) obtaining maximum ratio of unsuccessfully delivered packets tolerable and maximum delay budget tolerable by application to receive the new flow, and if the maximum delay budget is less than the delay budget that can be provided by the wireless local area network, rejecting the flow and if the maximum ratio of unsuccessfully delivered packets tolerable is than can be provided by the wireless local area network rejecting the flow, but otherwise proceeding to step f);

f) determining the probabilities of successful transmission based on said solving of said system of nonlinear equations and applying network stability conditions to the solution of the system of nonlinear equations;

g) calculating queuing delays and calculating service delays, and if determined not satisfactory rejecting the flow;

i) calculating fractions of missed packets and if determined not satisfactory, rejecting the flow.

9. The method as claimed in claim 1, wherein the estimate of delay is used in admission control for contention-based access of flows of the same access category (AC) to the wireless transmission medium, and wherein the method includes:

a) employing an analytical approximation of delays experienced by packets when delivered via I.E.E.E. 802.11 Enhanced Distributed Channel Access (EDCA) mode; and b) employing an admission control algorithm assuring that all existing admitted packet flows from existing mobile devices meet their delay requirements before admitting a new packet flow from a new mobile device.

10. In a wireless local area network having an access point station and user stations sharing access to a wireless transmission medium in accordance with IEEE standard 802.11e, a computer-implemented method of the access point station responding to a request from a user station for access of a new traffic flow of data packets from the user station to the wireless transmission medium in accordance with Enhanced Distributed Channel Access (EDCA) when the wireless transmission medium is carrying a number of already admitted traffic flows of data packets, the new traffic flow and the already admitted traffic flows having quality of service requirements including maximum delay budgets and ratios of unsuccessfully delivered data packets tolerated by applications that receive the already admitted traffic flows, the method comprising the steps of:

(a) applying a periodic traffic model of the wireless local area network to estimate delay that the data packets will experience when delivered through the wireless local area network, including solving a system of nonlinear equations, derived from expressions of probability of occurrences of wireless medium states that stations may sense, to determine probabilities of successful transmission, in order to determine whether or not admission of the new traffic flow will violate the quality of service requirements of the new traffic flow or the already admitted traffic flows; and (b) admitting the new traffic flow upon determining that admission of the new traffic flow will violate the quality of service requirements of neither the new traffic flow nor of the already admitted traffic flows; and wherein the estimate of delay is used in admission control for contention-based access of flows of the same access category (AC) to the wireless transmission medium, wherein said admission control includes:

accessing EDCA parameters and Quality of Service (QoS) parameters pertaining to total budget delay and ratio of unsuccessful packets tolerated specified a priori;

based on the periodic traffic model deriving inter-arrival packet rate and virtual time slot lengths;

receiving a request from a new user station seeking a connection; and determining the probabilities of successful transmission based on said solving of said system of nonlinear equations.

11. The method as claimed in claim 10, wherein the step (b) of applying the model of the wireless local area network includes determining an average data packet inter-arrival rate.

12. The method as claimed in claim 10, which further includes applying network stability conditions to the solution of the system of nonlinear equations to determine that the network will be stable upon admitting the new traffic flow.

13. The method as claimed in claim 10, which includes computing an upper bound on queuing delay for data packets of the traffic flows, and comparing the upper bound on the queuing delay for the data packets of the traffic flows to a delay parameter for the quality of service for the network to determine that the upper bound on the queuing delay for the data packets of the traffic flows can be met by the wireless local area network.

14. The method as claimed in claim 10, which includes computing a service delay budget for data packets of the traffic flows, computing an expected fraction of missed data packets from the service delay budget, and comparing the expected fraction of missed data packets to a quality of service fraction of missed data packets for the wireless local area network to determine that the expected fraction of missed data packets can be met by the wireless local area network.

15. The method as claimed in claim 10, wherein the estimate of delay is used in admission control for contention-based access of flows of the same access category (AC) to the wireless transmission medium, wherein said admission control includes:

a) specifying EDCA parameters and QoS parameters pertaining to total budget delay and ratio of unsuccessful packets tolerated a priori;

b) based on the periodic traffic model deriving inter-arrival packet rate and virtual time slot lengths;

c) receiving a request from a new user station seeking a connection;

d) based on the request in c) re-computing inter-arrival packet rate and virtual time slot lengths;

e) obtaining maximum ratio of unsuccessfully delivered packets tolerable and maximum delay budget tolerable by application to receive the new flow, and if the maximum delay budget is less than the delay budget that can be provided by the wireless local area network, rejecting the flow and if the maximum ratio of unsuccessfully delivered packets tolerable is than can be provided by the wireless local area network rejecting the flow, but otherwise proceeding to step f);

f) determining the probabilities of successful transmission based on said solving of said system of nonlinear equations and applying network stability conditions to the solution of the system of nonlinear equations;

g) calculating queuing delays and calculating service delays, and if determined not satisfactory rejecting the flow;

i) calculating fractions of missed packets and if determined not satisfactory, rejecting the flow.

16. An access point station for a wireless local area network having user stations sharing access to a wireless transmission medium in accordance with IEEE standard 802.11e, the access point station comprising:

a network interface for linking the access point station to a wireline network;

a wireless transceiver for wireless communication with the user stations; and at least one processor programmed for responding to a request from a user station for access of a new traffic flow of data packets from the user station to the wireless transmission medium in accordance with Enhanced Distributed Channel Access (EDCA) when the wireless transmission medium is carrying a number of already admitted traffic flows of data packets, the new traffic flow and the already admitted traffic flows having quality of service requirements including maximum delay budgets and ratios of unsuccessfully delivered data packets tolerated by applications that receive the already admitted traffic flows, said at least one processor being programmed for:

(a) applying a periodic traffic model of the wireless local area network to estimate delay that the data packets will experience when delivered through the wireless local area network, including solving a system of nonlinear equations, derived from expressions of probability of occurrences of wireless medium states, to determine probabilities of successful transmission, in order to determine whether or not admission of the new traffic flow will violate the quality of service requirements of the new traffic flow or the already admitted traffic flows; and (b) admitting the new traffic flow upon determining that admission of the new traffic flow will violate the quality of service requirements of neither the new traffic flow nor of the already admitted traffic flows; and wherein the estimate of delay is used in admission control for contention-based access of flows of the same access category (AC) to the wireless transmission medium, wherein said admission control includes:

accessing EDCA parameters and Quality of Service (QoS) parameters pertaining to total budget delay and ratio of unsuccessful packets tolerated specified a priori;

based on the periodic traffic model deriving inter-arrival packet rate and virtual time slot lengths;

receiving a request from a new user station seeking a connection; and determining the probabilities of successful transmission based on said solving of said system of nonlinear equations.

17. The access point station as claimed in claim 16, wherein said at least one processor is programmed for determining an average data packet inter-arrival rate.

18. The access point station as claimed in claim 16, wherein said at least one processor is programmed for applying network stability conditions to the solution of the system of nonlinear equations to determine that the network will be stable upon admitting the new traffic flow.

19. The access point station as claimed in claim 16, wherein said at least one processor is programmed for computing an upper bound on queuing delay for data packets of the traffic flows, and comparing the upper bound on the queuing delay for the data packets of the traffic flows to a delay parameter for the quality of service for the network to determine that the upper bound on the queuing delay for the data packets of the traffic flows can be met by the wireless local area network.

20. The access point station as claimed in claim 16, wherein said at least one processor is programmed for computing a service delay budget for data packets of the traffic flows, computing an expected fraction of missed data packets from the service delay budget, and comparing the expected fraction of missed data packets to a quality of service fraction of missed data packets for the wireless local area network to determine that the expected fraction of missed data packets can be met by the wireless local area network.

21. The access point station as claimed in claim 16, wherein the estimate of delay is used in admission control for contention-based access of flows of the same access category (AC) to the wireless transmission medium, wherein said admission control includes:

a) specifying EDCA parameters and QoS parameters pertaining to total budget delay and ratio of unsuccessful packets tolerated a priori;

b) based on the periodic traffic model deriving inter-arrival packet rate and virtual time slot lengths;

c) receiving a request from a new user station seeking a connection;

d) based on the request in c) re-computing inter-arrival packet rate and virtual time slot lengths;

e) obtaining maximum ratio of unsuccessfully delivered packets tolerable and maximum delay budget tolerable by application to receive the new flow, and if the maximum delay budget is less than the delay budget that can be provided by the wireless local area network, rejecting the flow and if the maximum ratio of unsuccessfully delivered packets tolerable is than can be provided by the wireless local area network rejecting the flow, but otherwise proceeding to step f);

f) determining the probabilities of successful transmission based on said solving of said system of nonlinear equations and applying network stability conditions to the solution of the system of nonlinear equations;

g) calculating queuing delays and calculating service delays, and if determined not satisfactory rejecting the flow;

i) calculating fractions of missed packets and if determined not satisfactory, rejecting the flow.

22. A method performed by a network access point for maintaining quality of service assurance for real time traffic in an I.E.E.E. 802.11 network using admission control for contention-based access of wireless mobile user devices, comprising:

evaluating whether mobile user devices can be admitted into a network without violating delay and loss requirements of mobile users currently attached to the network and determining when to admit a new communication packet flow of a new mobile user while preserving the quality of service of existing packet flows of existing mobile users, including:

employing an analytical approximation of communication delays experienced by packets when delivered via I.E.E.E. 802.11 Enhanced Distributed Channel Access (EDCA) mode; and employing an admission control algorithm assuring that all existing mobile user flows and all new mobile user flows being admitted meet their delay requirements; further including wherein an estimate of delay is used in admission control for contention-based access of flows of the same access category (AC) to the wireless transmission medium, wherein said admission control includes:

accessing EDCA parameters and Quality of Service (QoS) parameters pertaining to total budget delay and ratio of unsuccessful packets tolerated specified a priori;

based on a periodic traffic model deriving inter-arrival packet rate and virtual time slot lengths;

receiving a request from a new user station seeking a connection; and determining the probabilities of successful transmission based on solving of a system of nonlinear equations.

* * * * *